US008930674B2

(12) United States Patent
Avudaiyappan et al.

(10) Patent No.: US 8,930,674 B2
(45) Date of Patent: Jan. 6, 2015

(54) SYSTEMS AND METHODS FOR ACCESSING A UNIFIED TRANSLATION LOOKASIDE BUFFER

(75) Inventors: Karthikeyan Avudaiyappan, Sunnyvale, CA (US); Mohammad Abdallah, San Jose, CA (US)

(73) Assignee: Soft Machines, Inc., Santa Clara, CA (US)

( * ) Notice: Subject to any disclaimer, the term of this patent is extended or adjusted under 35 U.S.C. 154(b) by 140 days.

(21) Appl. No.: 13/414,456

(22) Filed: Mar. 7, 2012

(65) Prior Publication Data
US 2013/0238874 A1    Sep. 12, 2013

(51) Int. Cl.
G06F 13/20    (2006.01)

(52) U.S. Cl.
USPC ............. 711/207; 710/52; 711/118; 711/203; 711/206

(58) Field of Classification Search
USPC ................. 710/52; 711/118, 203, 206, 207
See application file for complete search history.

(56) References Cited

U.S. PATENT DOCUMENTS

| | | | |
|---|---|---|---|
| 4,075,704 A | 2/1978 | O'Leary | |
| 4,245,344 A | 1/1981 | Richter | |
| 4,356,550 A | 10/1982 | Katzman et al. | |
| 4,414,624 A | 11/1983 | Summer, Jr. et al. | |
| 4,524,415 A | 6/1985 | Mills, Jr. et al. | |
| 4,527,237 A | 7/1985 | Frieder et al. | |
| 4,577,273 A | 3/1986 | Hoppert et al. | |
| 4,597,061 A | 6/1986 | Cline et al. | |
| 4,600,986 A | 7/1986 | Scheuneman et al. | |
| 4,633,434 A | 12/1986 | Scheuneman | |
| 4,682,281 A | 7/1987 | Woffinden et al. | |
| 4,816,991 A | 3/1989 | Watanabe et al. | |
| 4,920,477 A | 4/1990 | Colwell et al. | |
| 5,294,897 A | 3/1994 | Notani et al. | |
| 5,317,705 A | 5/1994 | Gannon et al. | |
| 5,317,754 A | 5/1994 | Blandy et al. | |
| 5,548,742 A | 8/1996 | Wang et al. | |
| 5,559,986 A | 9/1996 | Alpert et al. | |
| 5,574,878 A | 11/1996 | Onodera et al. | |
| 5,634,068 A | 5/1997 | Nishtala et al. | |
| 5,752,260 A | 5/1998 | Liu | |
| 5,754,818 A | 5/1998 | Mohamed | |
| 5,787,494 A | 7/1998 | DeLano et al. | |
| 5,806,085 A | 9/1998 | Berliner | |

(Continued)

FOREIGN PATENT DOCUMENTS

| | | |
|---|---|---|
| EP | 0596636 | 5/1994 |
| EP | 0706133 | 4/1996 |
| WO | 0125921 | 4/2001 |

OTHER PUBLICATIONS

Barham et al., "Xen and the Art of Virtualization," ACM Symposium on Operating Systems Principles, Oct. 19, 2003, pp. 164-177.

*Primary Examiner* — Jae Yu

(57) ABSTRACT

Systems and methods for accessing a unified translation lookaside buffer (TLB) are disclosed. A method includes receiving an indicator of a level one translation lookaside buffer (L1TLB) miss corresponding to a request for a virtual address to physical address translation, searching a cache that includes virtual addresses and page sizes that correspond to translation table entries (TTEs) that have been evicted from the L1TLB, where a page size is identified, and searching a second level TLB and identifying a physical address that is contained in the second level TLB. Access is provided to the identified physical address.

20 Claims, 5 Drawing Sheets

(56) References Cited

U.S. PATENT DOCUMENTS

| | | |
|---|---|---|
| 5,852,738 A | 12/1998 | Beakowski et al. |
| 5,860,146 A | 1/1999 | Vishin et al. |
| 5,872,985 A | 2/1999 | Kimura |
| 5,905,509 A | 5/1999 | Jones et al. |
| 5,918,251 A | 6/1999 | Yamada et al. |
| 5,956,753 A | 9/1999 | Glew et al. |
| 5,974,506 A | 10/1999 | Sicola et al. |
| 6,075,938 A | 6/2000 | Bugnion et al. |
| 6,088,780 A | 7/2000 | Yamada et al. |
| 6,092,172 A | 7/2000 | Nishimoto et al. |
| 6,134,634 A | 10/2000 | Marshall et al. |
| 6,138,226 A | 10/2000 | Yoshioka et al. |
| 6,167,490 A | 12/2000 | Levy et al. |
| 6,212,613 B1 | 4/2001 | Belair |
| 6,226,732 B1 | 5/2001 | Pei et al. |
| 6,260,131 B1 | 7/2001 | Kikuta et al. |
| 6,272,662 B1 | 8/2001 | Jadav et al. |
| 6,275,917 B1 * | 8/2001 | Okada .................. 711/207 |
| 6,341,324 B1 | 1/2002 | Caulk, Jr. et al. |
| 6,437,789 B1 | 8/2002 | Tidwell et al. |
| 6,604,187 B1 | 8/2003 | McGrath et al. |
| 6,658,549 B2 | 12/2003 | Wilson et al. |
| 6,681,395 B1 | 1/2004 | Nishi |
| 6,907,600 B2 | 6/2005 | Neiger et al. |
| 6,912,644 B1 | 6/2005 | O'Connor et al. |
| 7,111,145 B1 | 9/2006 | Chen et al. |
| 7,149,872 B2 | 12/2006 | Rozas et al. |
| 7,278,030 B1 | 10/2007 | Chen et al. |
| 7,380,096 B1 | 5/2008 | Rozas et al. |
| 7,406,581 B2 * | 7/2008 | Southwell ................ 711/209 |
| 7,546,420 B1 * | 6/2009 | Shar et al. ............... 711/133 |
| 7,913,058 B2 | 3/2011 | Rozas et al. |
| 8,145,844 B2 | 3/2012 | Bruce |
| 8,239,656 B2 | 8/2012 | Rozas et al. |
| 8,301,847 B2 | 10/2012 | Dantzig et al. |
| 8,522,253 B1 | 8/2013 | Rozas et al. |
| 2002/0069326 A1 | 6/2002 | Richardson et al. |
| 2002/0099913 A1 | 7/2002 | Steely, Jr. |
| 2003/0088752 A1 * | 5/2003 | Harman ................... 711/202 |
| 2004/0064668 A1 | 4/2004 | Kjos et al. |
| 2004/0117593 A1 | 6/2004 | Uhlig et al. |
| 2004/0117594 A1 * | 6/2004 | VanderSpek ............ 711/209 |
| 2004/0205296 A1 | 10/2004 | Bearden |
| 2005/0027961 A1 | 2/2005 | Zhang |
| 2005/0060457 A1 | 3/2005 | Olukotun |
| 2005/0108480 A1 | 5/2005 | Correale et al. |
| 2006/0026381 A1 * | 2/2006 | Doi et al. ................. 711/207 |
| 2006/0277365 A1 | 12/2006 | Pong |
| 2008/0077813 A1 | 3/2008 | Keller et al. |
| 2009/0138659 A1 | 5/2009 | Lauterbach |
| 2009/0157980 A1 | 6/2009 | Bruce |
| 2009/0164733 A1 | 6/2009 | Kim et al. |
| 2009/0172344 A1 | 7/2009 | Grochowski et al. |
| 2010/0169578 A1 | 7/2010 | Nychka et al. |
| 2011/0010521 A1 | 1/2011 | Wang et al. |
| 2011/0153955 A1 | 6/2011 | Herrenschmidt et al. |
| 2012/0042126 A1 | 2/2012 | Krick et al. |
| 2013/0046934 A1 | 2/2013 | Nychka et al. |
| 2013/0346699 A1 | 12/2013 | Walker |

* cited by examiner

SYSTEMS AND METHODS FOR ACCESSING A UNIFIED TRANSLATION LOOKASIDE BUFFER

Virtual addressing is a memory mapping mechanism that is used by operating systems for purposes such as security based on process isolation. Using virtual addressing, processors can access memory, using physical addresses that are generated from Virtual Address (VA) to Physical Address (PA) translation. To accelerate the VA to PA translation process, processors can use Translation Lookaside Buffers (TLB), which are CAM+RAM structures that cache VA to PA translations.

In conventional systems the actual mapping of virtual addresses to physical addresses is a responsibility of software such as an Operating System (OS). The OS maintains memory resident translation tables (aka page tables) which are accessed by the system processor during the VA to PA translation process. These tables facilitate translation at page boundaries. For example, consecutive $2^{12}$ (e.g., 4K) bytes of VA may be translated to a continuous 4K bytes of PA space, by a single Translation Table Entry (TTE). Many architectures support multiple page sizes.—The following example explains translation at page boundaries where based on a 4K page size, a consecutive of 4K bytes of VA are translated to a continuous 4K bytes of PA space.

Consider the case where an OS provides a single TTE (which is a 32 or 64 bits data structure in main memory) that translates accesses from VA=0x1000 to 0x2000. Because the TTE provides translation at a 4K page boundary, VA[11:0] (the first twelve bits of the VA) are not translated, while VA[31:12] (the last 20 bits of the VA) are translated. In particular, PA[11:0]=VA[11:0], while PA[31:12] can be any value that is provided by the TTE.

For a TTE that provides translation at a 64K page boundary, VA[15:0] are not translated, e.g., PA[15:0]=VA[15:0], while VA[31:16] are translated to arrive at a value for PA[31:16]. The TTE records the page size. If the TTE is cached in TLB, then the processor must use the page size information from the TTE, to decide which bits of the VA are translated and which are not. The TLB is organized and accessed like a cache. For example, it could be direct mapped with 4 entries where each of the entries of the TLB can have any page size.

Further consider a TLB that has cached entries 0-3, where entry 0 is a 4K page TTE, entry 1 is a 64K page TTE, entry 2 is a 1M page TTE and entry 3 is a 16M page TTE. If the aforementioned TLB is a direct mapped cache, when a load/store/instruction fetch request has its VA translated to a PA, two things happen: (1) the request selects one of the 4 entries in TLB to access, and (2) the accessed entry of the TLB provides PA[31:12] and page size. Based on the page size, the VA bits that are to be translated are determined.

Consider further still a request that accesses the TLB for a VA to PA translation that is not provided with the page size that the OS has designated for translation of the VA range associated with the request. Because the request is not provided with the page size, the request can serially access the TLB based on respective page sizes, until one of the page sizes that is used results in a hit. If the request accesses the TLB initially based on a 4K page sized entry, the two bits of the VA that can be used to select one of the 4 entries in the TLB, are VA[13:12]. If there is a miss at the 4K page size, an access can be attempted at the next bigger page size, 64K where the VA bits that can be used to select one of the 4 entries of the TLB are VA[17:16]. If there is a miss at the 64K page size, then an access may be attempted at the 1M page size, where the VA bits that can be used to select one of the 4 entries of the TLB are VA[22:21]. Finally, given misses at the other 3 page sizes, the request can access the TLB based on VA[25:24] in order to check for a translation table entry at the 16M page size.

As is clear from the above discussion, because a conventional TLB can cache TTEs of any page size, situations can arise where a request may be required to examine the TLB for all possible page sizes in order to determine a hit. This is because a request may not always obtain a desired translation from the TLB in its initial accesses. The process of repeating TLB accesses, once for each page size, is a significant performance bottleneck for TLB systems.

SUMMARY

Conventional approaches that rely upon a series of accesses to a second level translation lookaside buffer (TLB) using a plurality of different page sizes present significant performance bottlenecks for TLB systems. A page size cache based methodology that addresses such shortcomings by providing a page size upon which a search of the second level TLB can be based is disclosed. However, the claimed embodiments are not limited to implementations that address any or all of the aforementioned shortcomings. As a part of the disclosed methodology, an indicator is received of a level one translation lookaside buffer (L1TLB) miss corresponding to a request for a virtual address to physical address translation, a cache is searched that includes virtual addresses and page sizes that correspond to translation table entries (TTEs) that have been evicted from the L1TLB, where a page size is identified, and the second level TLB is searched and a physical address is identified that is contained in the second level TLB. Access is provided to the identified physical address. Because the location of the TTE corresponding to the translation request can be identified in the second level TLB based on the page size, a TTE corresponding to the translation request can be identified in a single clock cycle and the necessity of conducting a series of searches that are based on a plurality of different page sizes can be avoided. The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
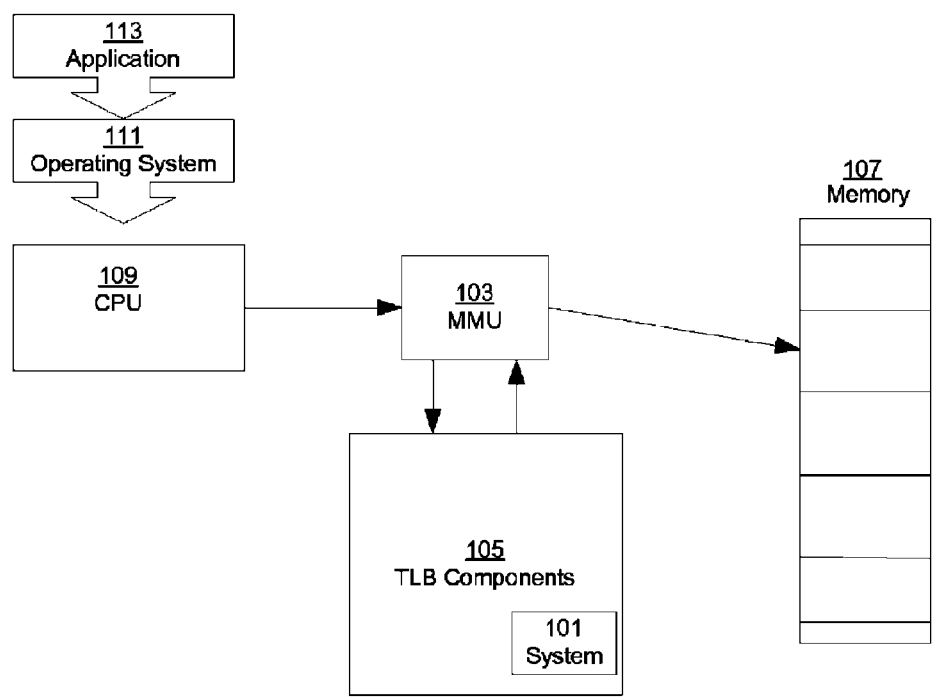
FIG. 1A shows an exemplary operating environment of a system for accessing a unified translation lookaside buffer (TLB) according to one embodiment according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "searching" or "identifying" or "providing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1B:
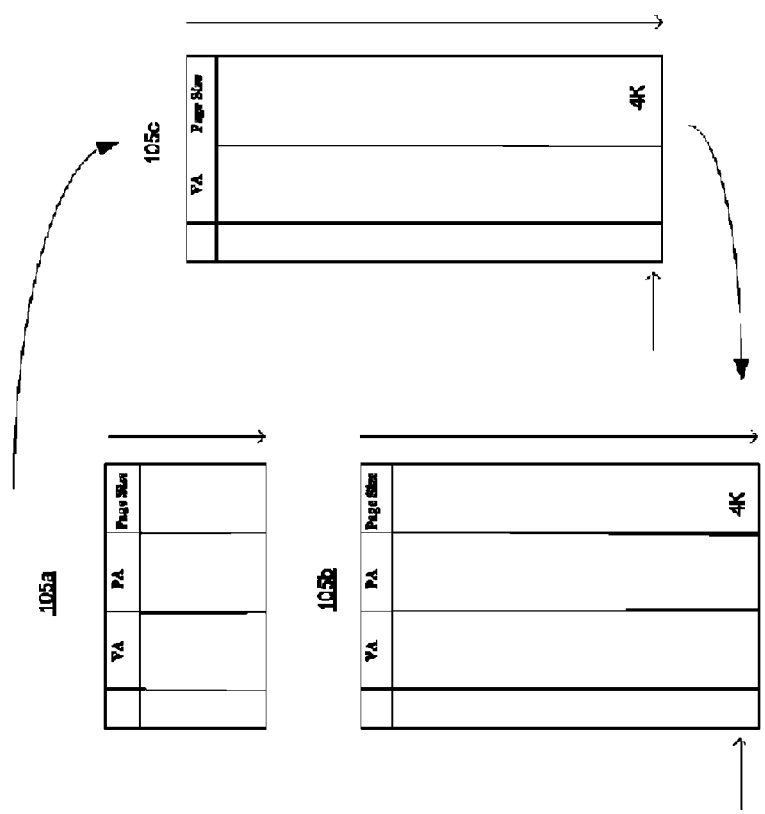
FIG. 1B shows translation lookaside buffer (TLB) components that include a page size cache that contains entries that correspond to evicted entries from a level one translation lookaside (L1TLB) buffer according to one embodiment.

Exemplary Operating Environment of a System for Accessing a Unified Translation Lookaside Buffer According to One Embodiment FIG. 1A shows an exemplary operating environment 100 of a system 101 for accessing a unified translation lookaside buffer (TLB) according to one embodiment. In a TLB that contains entries having a plurality of page sizes, system 101 ascertains a page size of a translation table entry (TTE) that has been evicted from a level one translation lookaside buffer (L1TLB) from a page size cache and identifies a TTE (and its corresponding physical address) that corresponds to that page size in an L2TLB cache (or another level TLB cache such as an L3TLB cache etc.) within a single clock cycle. Accordingly, the necessity of conducting a series of searches that are based on a plurality of different page sizes is avoided. FIG. 1A shows system 101, MMU 103, TLB components 105, Memory 107, CPU 109 operating system 111 and application 113. In one embodiment, TLB components 105 include L1TLB 105a, L2TLB 105b and page size cache 105c as shown in FIG. 1B.

Referring to FIG. 1A, system 101 directs accesses to a unified second level TLB according to one embodiment. In one embodiment, as previously discussed, system 101 is able to identify a TTE (and its corresponding physical address) contained in an L2TLB (e.g., 105b in FIG. 1B) or other second level TLB in a single clock cycle upon the occurrence of a miss for that TTE in L1TLB (e.g., 105a in FIG. 1B). In one embodiment, this is facilitated by page size cache (e.g., 105c in FIG. 1B) which stores a virtual address (VA) and a page size for each of the TTEs that are evicted from the L1TLB. The page size cache can be accessed to provide a page size upon which a search of the L2TLB (and/or other second level TLB caches) can be based. In one embodiment, system 101 can be located in TLB components 105. In other embodiments, system 101 can be separate from TLB components 105 but operate cooperatively therewith.

TLB components 105 perform virtual address (VA) to physical address (PA) translation. Referring to FIG. 1B, in one embodiment, TLB components 105 can be comprised of: (1) a small unified translation lookaside buffer L1TLB 105a, (2) a large unified level 2 translation lookaside buffer L2TLB 105b, and (3) a page size cache 105c. TLB components 105 receive a virtual address (VA) from MMU 103 (see FIG. 1A) and generate a physical address (PA) that is provided back to MMU 103. In one embodiment, as is described herein, when the virtual address (VA) that is provided to TLB components 105 results in a miss with regard to L1TLB 105a, a search of page size cache 105c and L2TLB 105b (and/or other second level TLB caches), to determine a page size and to identify a corresponding TTE, respectively, is executed. Because the location of the TTE corresponding to the virtual address (VA) to physical address (PA) translation request can be identified in the L2TLB or other second level TLB cache based on the page size, it can be identified in a single clock cycle and the necessity of conducting a series of searches that are based on a plurality of different page sizes can be avoided. Thus, in one embodiment, page size cache 105c enables a highly accurate "prediction" or determination of the page size of the TTE that corresponds to a virtual address (VA) to physical address (PA) translation request. It should be appreciated that because, in one embodiment, the contents of page size cache 105c may be limited to page sizes and virtual addresses, page size cache 105c may be configured to have more depth than does a conventional L1TLB victim cache. In other embodiments, page size cache 105c can include information in addition to page sizes and virtual addresses. Although, as shown in FIG. 1B, page size cache 105c can be a part of TLB components 105, in other embodiments page size cache 105c can be separate from TLB components 105 but operate cooperatively therewith.

Referring again to FIG. 1A, CPU 109 executes the instructions of operating system 111 and application 113. As a part such operations, CPU 109 provides virtual addresses associated with application 113 to MMU 103 which manages accesses to memory 107.

Operating system 111 provides services to application 113 such as providing application 113 with memory space for its own use. Operating system 111 maps this space to virtual addresses.

Operation

Figure 1C:
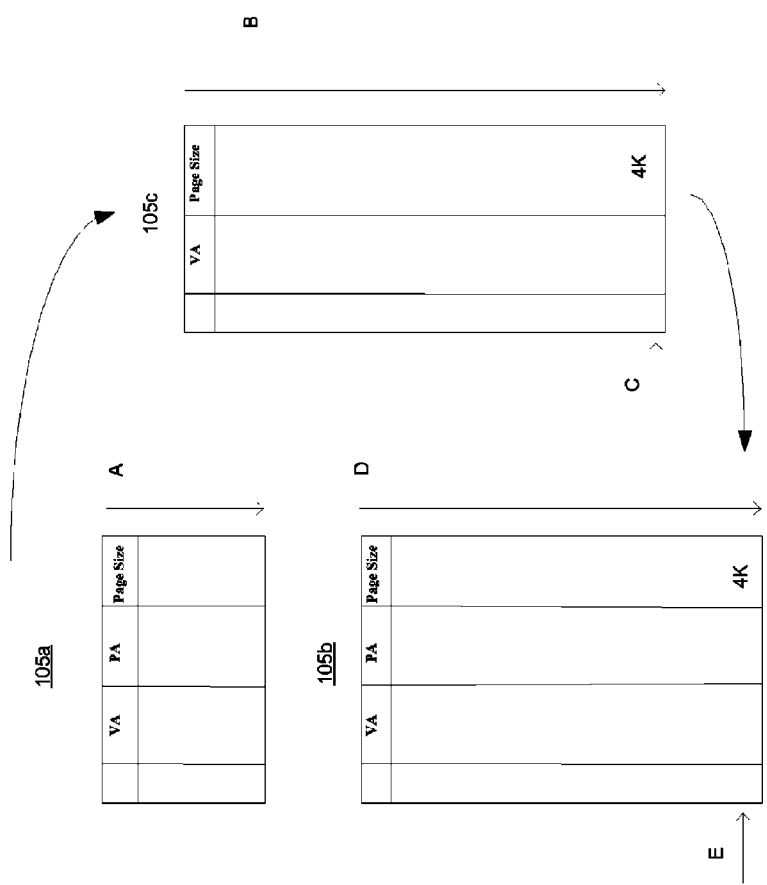
FIG. 1C illustrates operations performed by a system for accessing a unified TLB according to one embodiment.

FIG. 1C illustrate operations performed by system 101 for accessing a unified L2TLB according to one embodiment. These operations, which relate to accessing a unified L2TLB are illustrated for purposes of clarity and brevity. It should be appreciated that other operations not illustrated by FIG. 1C can be performed in accordance with one embodiment. In FIG. 1C, operations are illustrated by reference to schematics that correspond to L1TLB 105a, page size cache 105c and L2TLB 105b.

Referring to FIG. 1C, at A, upon receiving a virtual address (VA) to physical address (PA) translation request, L1TLB 105a is searched for the TTE (containing the desired physical address) to which the virtual address associated with the request corresponds.

At B, because the desired TTE is not found in L1LTB 105a, a miss occurs which prompts a search of page size cache 105c to identify a page size upon which a search of L2LTB 105b can be based.

At C, a page size upon which a search of L2LTB 105b (and/or other second level TLB caches) is to be based is identified in the page size cache 105c. In one embodiment, the page size (e.g., 4K, 64K, 1M and 64M) is used to determine which bits of the virtual address (VA) associated with the request are to be used to locate the address in L2LTB 105 (or other second level TLB) where the desired TTE resides. For example, for a 32 bit virtual address (VA), and 4K, 64K, 1M and 64M page sizes, virtual address bits VA[31:12], VA[31:16], VA[31:21] and VA[31:24] respectively may be used.

At D, a search of L2TLB 105b (and/or other second level TLB caches) is commenced based on the page size that was identified in operation C.

At E, the TTE and corresponding physical address corresponding to the virtual address associated with the translation request received by the TLB is identified. As discussed herein the physical address that is identified is provided to the MMU for use in accessing a corresponding location in memory.

As discussed herein, in support of the foregoing operations exemplary embodiments employ a small unified Level 1 TLB (L1TLB), a large unified Level 2 TLB (L2TLB) and a cache of page sizes. In conventional systems, L1TLB is accessed to obtain a physical address before L1 cache is accessed, and, upon a miss in L1TLB, L2TLB is accessed to obtain a physical address before L2 cache is accessed. Moreover, the L1TLB is usually a small and fully associative cache, hence, the loads can access L1TLB at all page sizes in the same clock cycle. However, L2TLB, because of its relatively large size, may not be a fully associative structure. As a result, L2LTB may not be accessed (e.g., searched) for all page sizes in a single clock cycle. However, in exemplary embodiments, if an access misses L1TLB 105a, then a desired TTE in L2TLB 105b (or another second level TLB) can be directly accessed based on a page size identified in a page size cache 105c, so that the system is not forced to repeat the access to L2TLB 105b (and/or other second level TLBs) at each of the possible page sizes until a TLB hit is obtained. In one embodiment, if an access misses L2TLB 105b and/or other secondary level TLBs based on the page size obtained from page size cache 105c, software maintenance to remove stale TTEs is not necessary (in such situations a search of L2TLB 105b and/or other secondary level TLBs using the next page size can be commenced). Accordingly, the overhead incurred from such software maintenance can be avoided.

Figure 2:
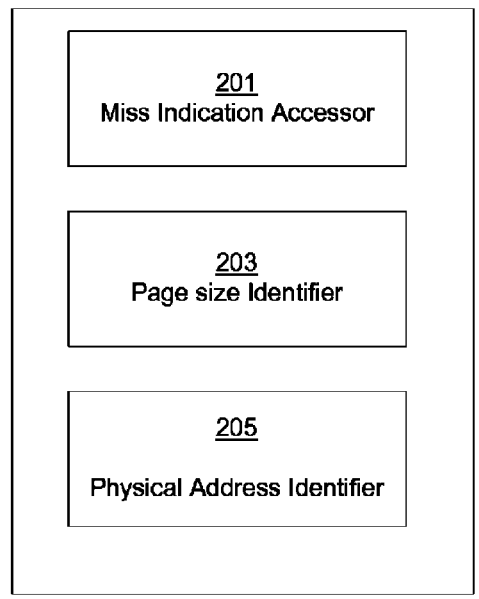
FIG. 2 shows components of a system for accessing a unified TLB according to one embodiment.

Components of System for Accessing a Unified Translation Lookaside Buffer According to one Embodiment FIG. 2 shows components of a system 101 for accessing a unified translation lookaside buffer (L2TLB) according to one embodiment. In one embodiment, components of system 101 implement an algorithm for accessing a unified TLB. In the FIG. 3 embodiment, components of system 101 include miss indication accessor 201, page size identifier 203 and physical address identifier 205.

Miss indication accessor 201 accesses an indication of a level one translation lookaside buffer (L1TLB) miss. In one embodiment, a miss is indicated when a search of the contents of L1TLB for a TTE (and corresponding physical address) that corresponds to virtual address (VA) to physical address (PA) translation request results in the TTE not being found.

Page size identifier 203 searches a page size cache (e.g., 105c in FIG. 1B) in response to an L1TLB (e.g., 105a in FIG. 1B) miss indication. In one embodiment, the page size cache stores virtual addresses and page sizes. In one embodiment, the virtual addresses and page sizes that are stored in the page size cache correspond to TTEs that have been evicted from an L1TLB (e.g., 105b in FIG. 1B). In one embodiment, the identification of a page size in the page size cache enables the system to avoid having to make repeated accesses to L2TLB and/or other second level TLBs based on each of the possible page sizes, until a TLB hit is obtained. In one embodiment, the page size determines the bits of the virtual address (VA) that can be translated to identify the location of the desired TTE in the L2TLB or other second level TLB cache.

Physical address identifier 205 uses the page size that is identified in the page size cache to search L2TLB and/or other second level TLBs for a TTE (that contains the desired physical address) that corresponds to the virtual address (VA) translation request. The page size enables the TTE to be directly located such that a search for the TTE can be executed within a single clock cycle.

It should be appreciated that the aforementioned components of system 101 can be implemented in hardware or software or in a combination of both. In one embodiment, components and operations of system 101 can be encompassed by components and operations of one or more computer components or programs (e.g., TLB search algorithm or circuitry). In another embodiment, components and operations of system 101 can be separate from the aforementioned one or more computer components or programs but can operate cooperatively with components and operations thereof.

Figure 3:
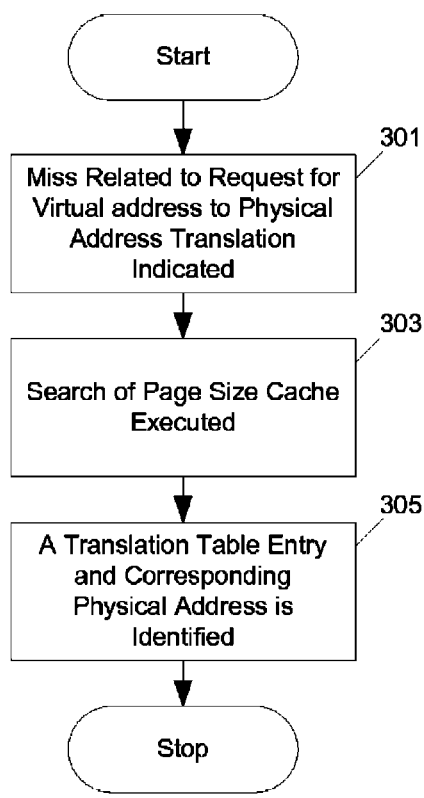
FIG. 3 shows a flowchart of the steps performed in a method for accessing a unified TLB according to one embodiment.

Method for Accessing a Unified Translation Lookaside Buffer According to one Embodiment FIG. 3 shows a flowchart 300 of the steps performed in a method for accessing a unified translation lookaside buffer (TLB) according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart. Although specific steps are disclosed in the flowcharts, such steps are exemplary. That is the present embodiments are well suited to performing various other steps or variations of the steps recited in the flowcharts.

Referring to FIG. 3, at 301 a miss related to a request for a virtual address (VA) translation in a level one translation lookaside buffer (L1TLB) is indicated.

At 303 a search of a page size cache is executed in response to the L1LTB miss indication. In one embodiment, the page size cache stores only virtual addresses and page sizes. In other embodiments, the page size cache can additionally store other information. In one embodiment, the virtual addresses and page sizes that are stored in the page size cache correspond TTEs that have been evicted from the L1TLB.

At 305 a TTE and corresponding physical address is identified from a search of the L2TLB (and/or other second level TLBs) executed based on the page size that is identified in the page size cache.

With regard to exemplary embodiments thereof, systems and methods for accessing a unified translation lookaside buffer (TLB) are disclosed. A method includes receiving an indicator of a level one translation lookaside buffer (L1TLB) miss corresponding to a request for a virtual address to physical address translation, searching a cache that includes virtual addresses and page sizes that correspond to translation table entries (TTEs) that have been evicted from the L1TLB, where a page size is identified, and searching the L2TLB (and/or other second level TLBs) and identifying a physical address that is contained in the L2TLB. Access is provided to the identified physical address.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for accessing a unified translation lookaside buffer (TLB), comprising:
    receiving an indicator of a level one translation lookaside buffer (L1TLB) miss corresponding to a request for a virtual address to physical address translation;
    in response to said indicator, searching a cache comprising virtual addresses and page sizes that correspond to translation table entries (TTE's) that have been evicted from said L1TLB, wherein a page size is identified;
    based on said identified page size, searching a second level TLB and identifying a physical address therein; and
    providing access to said physical address.

2. The method of claim 1 wherein said searching said cache and said identifying said physical address is performed in a single clock cycle.

3. The method of claim 1 wherein said page size determines the bits of the virtual address that are translated.

4. The method of claim 1 wherein said page size determines the bits of the virtual address that are translated which identify an address where a desired TTE is located.

5. The method of claim 1 wherein a search of said second level TLB based on a single page size is executed to find a physical address wherein said second level TLB is of n-way associativity.

6. The method of claim 1 wherein said page size is the correct size of the page that is associated with said physical address.

7. The method of claim 1 wherein said cache does not provide virtual address to physical address translation.

8. A method for accessing a unified translation lookaside buffer (TLB), comprising:
    receiving a request for a virtual address to physical address translation;
    searching a level one translation lookaside buffer for a translation table entry (TTE) that corresponds to said request;
    receiving an indication of a level one translation lookaside buffer (L1TLB) miss corresponding to said request for said virtual address to physical address translation;
    in response to said indication, searching a cache comprising virtual addresses and page sizes that correspond to TTE's that have been evicted from said L1TLB, wherein a page side is identified;
    based on said identified page size, searching a second level TLB and identifying a TTE entry that includes a physical address therein; and
    providing access to said physical address as a response to said request.

9. The method of claim 8 wherein said searching said cache and said identifying said physical address is performed in a single clock cycle.

10. The method of claim 8 wherein said page size determines the bits of the virtual address that are translated.

11. The method of claim 8 wherein said page size determines the bits of the virtual address that are translated which identify an address where a desired TTE is located.

12. The method of claim 8 wherein a search of said second level TLB based on a single page size is executed to find a physical address wherein said second level TLB is of n-way associativity.

13. The method of claim 8 wherein said page size is the correct size of the page that is associated with said physical address.

14. The method of claim 8 wherein said cache does not provide virtual address to physical address translation.

15. A computer system, comprising:
    a memory;
    a processor; and
    translation lookaside buffer components comprising:
        a level one translation lookaside buffer;
        a level two translation lookaside buffer;
        a page size cache; and
        a system for accessing a unified level two translation lookaside buffer (L2TLB), comprising:
            a receiving component for receiving an indication of a level one translation lookaside buffer (L1TLB) miss corresponding to a request for a virtual address to physical address translation;

a searching component for, in response to said indication, searching said page size cache comprising virtual addresses and page sizes that correspond to TTEs that have been evicted from an L1TLB, wherein a page side is identified;

a searching component for, based upon said identified page size, searching a second level TLB and identifying a physical address therein; and an access providing component for providing access to said physical address.

16. The system of claim 15 wherein said searching said cache and said identifying said physical address is performed in a single clock cycle.

17. The system of claim 15 wherein said page size determines the bits of the virtual address that are translated.

18. The system of claim 15 wherein said page size determines the bits of the virtual address that are translated which identify an address where a desired TTE is located.

19. The system of claim 15 wherein a search of said second level TLB based on a single page size is executed to find a physical address wherein said second level TLB is of n-way associativity.

20. The system of claim 15 wherein said page size cache does not provide virtual address to physical address translation.

* * * * *